United States Patent
Lin et al.

(10) Patent No.: US 10,175,431 B2
(45) Date of Patent: Jan. 8, 2019

(54) OPTICAL TRANSCEIVER WITH A MULTIPLEXING DEVICE POSITIONED OFF-CENTER WITHIN A TRANSCEIVER HOUSING TO REDUCE FIBER BENDING LOSS

(71) Applicant: Applied Optoelectronics, Inc., Sugar Land, TX (US)

(72) Inventors: Kai-Sheng Lin, Sugar Land, TX (US); Ziliang Cai, Richmond, TX (US); Stella Liang Chen, Richmond, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/242,005

(22) Filed: Aug. 19, 2016

(65) Prior Publication Data

US 2018/0052289 A1 Feb. 22, 2018

(51) Int. Cl.
*G02B 6/12* (2006.01)
*G02B 6/42* (2006.01)
*G02B 6/293* (2006.01)

(52) U.S. Cl.
CPC ......... *G02B 6/421* (2013.01); *G02B 6/12019* (2013.01); *G02B 6/2938* (2013.01);
(Continued)

(58) Field of Classification Search
CPC .............. G02B 6/421; G02B 6/12019; G02B 6/29329; G02B 6/2938; G02B 6/4246; G02B 6/4281; G02B 6/4292
(Continued)

(56) References Cited

U.S. PATENT DOCUMENTS 9,341,786 B1 * 5/2016 Gamache ................. G02B 6/30
9,419,717 B2 8/2016 Huang et al.
(Continued)

OTHER PUBLICATIONS

PCT Search Report-Written Opinion dated Sep. 22, 2017, received in corresponding PCT Application No. PCT/US17/47569, 9 pgs.
(Continued)

*Primary Examiner* — Jerry Blevins
(74) *Attorney, Agent, or Firm* — Grossman Tucker Perreault & Pfleger, PLLC; Norman S. Kinsella

(57) ABSTRACT

Techniques for reducing optical fiber bending loss in an optical transceiver are disclosed. In an embodiment, a small form-factor (SFF) optical transceiver housing includes a demultiplexer device, such as an arrayed waveguide grating (AWG) device, having a longitudinal center line that is offset laterally by a distance $D_{offset}$ from the longitudinal center line of the SFF optical transceiver housing. The lateral offset distance $D_{offset}$ may advantageously enable an intermediate optical fiber coupling the demultiplexer with an optical coupling receptacle, such as an LC connector, to be routed within the SFF optical transceiver housing in a manner that avoids introducing bends that are less than a minimum bending radius associated with the intermediate optical fiber cable. Thus some embodiments of the present disclosure enable greater tolerance when routing an intermediate optical fiber within housings that would otherwise introduce bending loss by virtue of their constrained dimensions.

18 Claims, 4 Drawing Sheets

(52) U.S. Cl.
CPC ....... *G02B 6/29329* (2013.01); *G02B 6/4246* (2013.01); *G02B 6/4281* (2013.01); *G02B 6/4292* (2013.01)

(58) Field of Classification Search
USPC .......................................................... 385/14
See application file for complete search history.

(56) References Cited

U.S. PATENT DOCUMENTS

| | | |
|---|---|---|
| 9,455,782 B2 | 9/2016 | Zheng et al. |
| 9,553,671 B1 | 1/2017 | Nagarajan et al. |
| 2008/0056644 A1* | 3/2008 | Naka ................... B29C 45/0013 385/55 |
| 2011/0058771 A1 | 3/2011 | Lee et al. |
| 2012/0092756 A1 | 4/2012 | Yoshida et al. |
| 2014/0241726 A1 | 8/2014 | Ho et al. |

OTHER PUBLICATIONS

U.S. Office Action dated Dec. 15, 2017, received in U.S. Appl. No. 15/613,655, 13 pgs.
U.S. Office Action dated May 9, 2018, received in U.S. Appl. No. 15/613,655, 15 pgs.
PCT International Search Report and Written Opinion dated Jul. 10, 2018, received in PCT Application No. PCT/US18/36057, 12 pgs.

* cited by examiner

OPTICAL TRANSCEIVER WITH A MULTIPLEXING DEVICE POSITIONED OFF-CENTER WITHIN A TRANSCEIVER HOUSING TO REDUCE FIBER BENDING LOSS

TECHNICAL FIELD

The present disclosure generally relates to optical transceiver modules, and more particularly, to an optical transceiver housing with a multiplexer device, such as an arrayed waveguide grating (AWG) device, at an off-center position to reduce fiber bending losses introduced by an optical fiber that optically couples an optical signal into the AWG device.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As channel density becomes an increasingly important aspect of optical transceivers, the ability scale-down while maintaining nominal transceiver performance raises numerous non-trivial challenges.

BRIEF DESCRIPTION OF THE DRAWINGS

These and other features and advantages will be better understood by reading the following detailed description, taken together with the drawings wherein.

Figure 1:
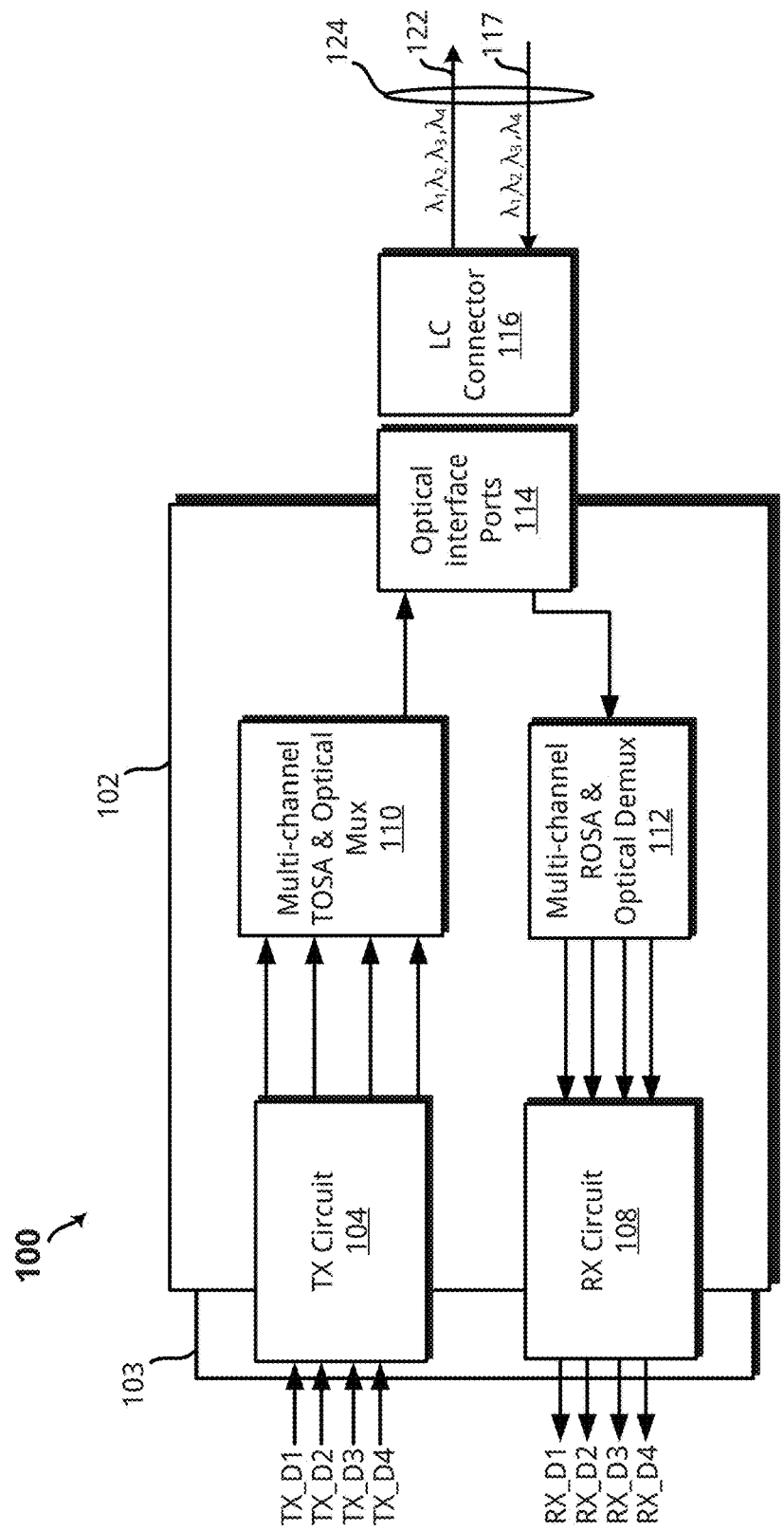
FIG. 1 schematically illustrates an embodiment of an optical transceiver module including a multi-channel transmitter optical sub-assembly (TOSA) and multi-channel receiver optical sub-assembly (ROSA).

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Optical transceivers can include receiver optical subassemblies (ROSAs) that are configured to receive multiple channel wavelengths via a common fiber and de-multiplex the same for detection, amplification and conversion purposes. To de-multiplex a received signal, such as a wavelength division multiplexed (WDM) signal, a ROSA may use an arrayed waveguide grating (AWG) device to separate channel wavelengths and to provide the separated channel wavelengths to associated detector devices such as photodiodes. To couple the received optical signal into an AWG device, transceivers can include a length of intermediate fiber that extends from, for example, an LC connector receptacle to a coupling port of the AWG device. In some cases, the intermediate fiber is communications grade optical fiber, e.g., compliant with IEC 60793-2-10 and 60793-50, which is based on a glass or "cladding" having a diameter of about 125 microns (μm) or less. The region at the center of the fiber that carries the optical signal is generally referred to as the "core" and may measure from a few microns to 62.5 μm in diameter, for example. The optical fiber properties, e.g., the core, refractive index profile and so on, that define optical performance are generally referred to as the "waveguide" although the term may also apply to the entire optical fiber as well.

The optical fiber properties of an optical fiber also govern the extent of bending prior to the introduction of loss due to macro and micro bending. Macro-bending of an optical fiber, for example, references bends generally visible to the human eye and can introduce signal attenuation. Such bends can cause light to "leak out" an increasing amount as the bend becomes more acute and alters the refractive index profile of the optical fiber. On the other hand, micro-bending generally refers to small, potentially imperceptible, radius bends of the fiber core caused by, for example, lateral contact with surfaces in the transceiver housing and twists in the fiber optic cable. Manufacturers generally suggest that the minimum ($R_{min}$) bending radius for an optical fiber be about no less than 15-20× the diameter of the optical fiber to avoid introducing macro and/or micro bending and maintain nominal performance. Stated differently, an acute bending radius that is less than 15× the diameter of the optical fiber may introduce unacceptable power loss. For instance, a fiber diameter of 0.25 mm may include a minimum bending radius of 4 mm.

Figure 3:
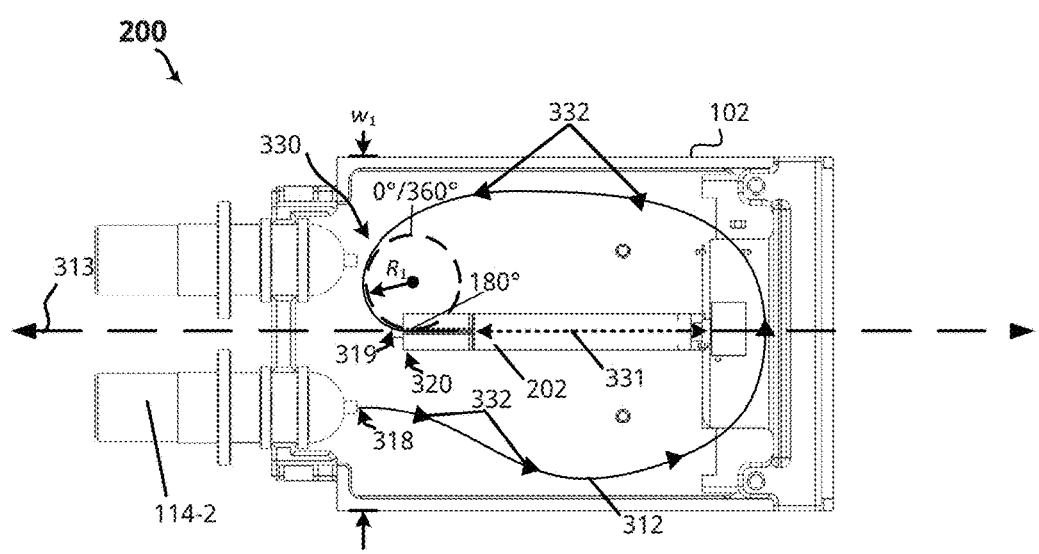
FIG. 3 shows a top plan view of the example SFF pluggable transceiver of FIG. 2, in accordance with an embodiment of the present disclosure.

However, routing of optical fiber within a SFF housing often requires some amount of bending to couple the same into multiplexing and/or other processing components of TOSAs and ROSAs. For example, FIG. 3 shows a top plan view of an example optical transceiver 200, and shows an intermediate optical fiber 312 routed in a bent/looped fashion to couple with an AWG device 202. The optical transceiver 200 is shown in a highly simplified form for purpose of practicality and clarity. As shown, the intermediate optical fiber 312 is disposed within a transceiver housing 102 and includes a first end 318 coupled to an optical coupling receptacle 114-2, e.g., an LC connector receptacle, and a second end 319 coupled to a coupling region 320 of the AWG device 202. The intermediate optical fiber 312 may include a path or route, collectively depicted by arrows 332, that necessitates one or more bends including the bend 330 that is adjacent to the second end 319 of the intermediate optical fiber 312. As further shown, the longitudinal center line 331 of the AWG 202 is coaxial with the longitudinal center line 313 of the transceiver housing 102, which results in bend radius $R_1$. As discussed above, the more acute the bend in the intermediate optical fiber 312 the more significant the change to the refractive index profile associated with the same. For the sake of illustration, consider an example scenario wherein the transceiver housing 102 includes a cross-wise width $W_1$ of about 8 mm. In this scenario, the bend radius $R_1$ may equal substantially equal to or less than 4 mm, which is about half the cross-wise width $W_1$ of the transceiver housing 102. This unfortunately leaves little tolerance to route the intermediate optical fiber 312 as the extent of bend radius $R_1$, even in a best-case scenario, may already be at or below the minimum bending radius ($R_{min}$) associated with the intermediate optical fiber 312 by virtue of the constrained dimensions within the transceiver housing 102.

Figure 4:
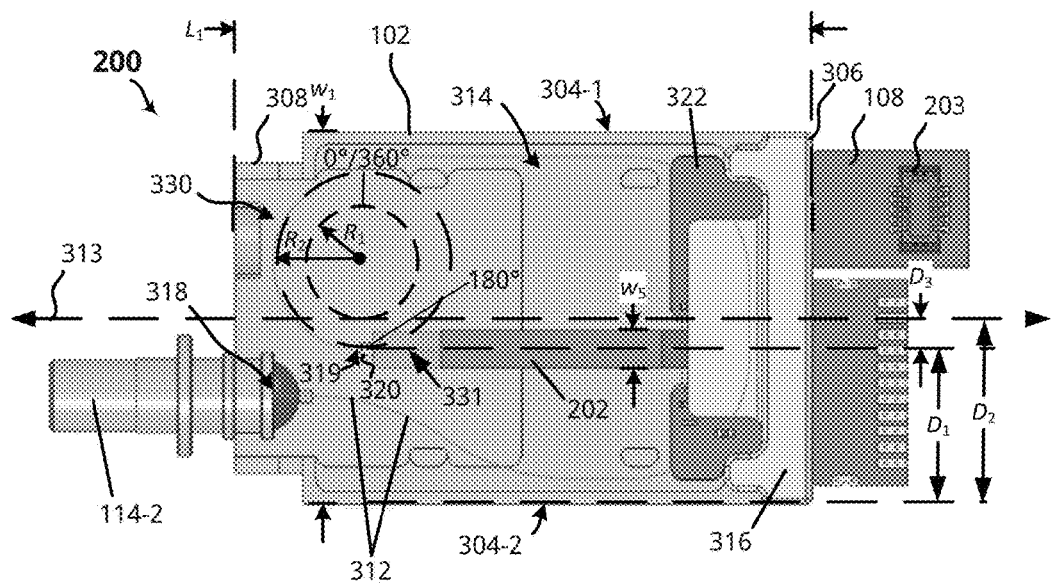
FIG. 4 shows another top plan view of the example SFF pluggable transceiver of FIG. 2 having an off-center arrayed waveguide grating (AWG) device, in accordance with an embodiment of the present disclosure.

Thus, the present disclosure has identified that placement of an optical demultiplexer device, such as an arrayed waveguide grating (AWG) device, laterally offset from the longitudinal center line of an optical transceiver housing may introduce additional tolerance for routing of an intermediate optical fiber. The laterally-offset position of the optical demultiplexer device may also be accurately referred to as an off-center housing position. In an embodiment, a length of the intermediate optical fiber adjacent to an input region of the optical demultiplexer device has a corresponding bend radius that is proportionally increased relative to the lateral offset. For instance, the AWG device 202 with a lateral offset of 1 millimeter (mm) relative to the longitudinal center 313 of the optical transceiver housing 102 may increase the bend radius of the bend 330 by an equal amount. The lateral offset may vary depending on a desired implementation. For example, the lateral offset may range between 0.05 mm to 5 mm, depending on the dimensions of the particular optical transceiver housing. By way of contrast to the embodiment shown in FIG. 3, FIG. 4 shows one such example lateral offset $D_{offset}$ for the AWG device 202 which results in radius $R_2$, which is discussed in greater detail further below. Thus the present disclosure provides techniques for selectively positioning an optical multiplexer/de-multiplexer within a transceiver housing to reduce the severity of the bends necessary to route an intermediate optical fiber, and by extension, maintain nominal performance of an optical transceiver. While specific examples and scenarios disclosed herein reference a ROSA arrangement having a AWG de-multiplexer device, other optical subassemblies such as TOSAs are within the scope of this disclosure. Moreover, other multiplexing/demultiplexing devices are within the scope of this disclosure and this disclosure is not necessarily limited to AWGs.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid or course wavelength division multiplexing (CWDM).

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another without the use of an intermediate device such as a fiber.

As used herein singular expressions such as "a," "an," and "the" are not limited to their singular form, and are intended to cover the plural forms as well unless the context clearly indicates otherwise.

From time to time one or more aspects of the present disclosure may be described using ranges. In such instances it should be understood that the indicated ranges are exemplary only unless expressly indicated otherwise. Moreover, the indicated ranges should be understood to include all of the individual values of falling within the indicated range, as though such values were expressly recited. Moreover, the ranges should be understood to encompass sub ranges within the indicated range, as though such sub ranges were expressly recited. By way of example, a range of 1 to 10 should be understood to include 2, 3, 4 . . . etc., as well as the range of 2 to 10, 3 to 10, 2 to 8, etc., as though such values and ranges were expressly recited.

Example Optical Transceiver System

Now turning to FIG. 1, there is an optical transceiver 100 consistent with embodiments of the present disclosure. In more detail, the optical transceiver 100 transmits and receives four (4) channels using four different channel wavelengths ($\lambda_1, \lambda_2, \lambda_3, \lambda_4$) and may be capable of transmission rates of at least about 25 gigabits (Gbs) per channel or more. In one example, the channel wavelengths $\lambda_1, \lambda_2, \lambda_3, \lambda_4$ may be 1270 nm, 1290 nm, 1310 nm, and 1330 nm, respectively. The optical transceiver 100 may also be capable of both short transmission distances of tens of meters, for example, to distances of 2 kilometers or more. The optical transceiver 100 may be used, for example, in internet data center applications or fiber to the home (FTTH) applications. In an embodiment, the optical transceiver 100 implements a Quad Small Form-Factor Plugging (QSFP) transceiver. For example, the optical transceiver 100 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+ transceivers. The optical transceiver 100 may be configured for dense wavelength division multiplexing (DWDM) or course wavelength division multiplexing (CWDM), depending on a desired configuration. Although aspects and scenarios disclosed herein discuss a four (4) channel configuration, other channel configurations, e.g., 2, 4, 16, 32, and so on, are within the scope of this disclosure.

As shown, the optical transceiver 100 includes a transceiver housing 102 that includes a multi-channel TOSA arrangement 110 for transmitting optical signals on different channel wavelengths, and a multi-channel ROSA 112 for receiving optical signals on different channel wavelengths. A transmit connecting circuit 104 and a receive connecting circuit 108 provide electrical connections to the multi-channel TOSA 110 and the multi-channel ROSA 112, respectively, within the transceiver housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA arrangement 110, e.g., laser assemblies, and the receive connecting circuit 108 electrically couples to the electronic components in the multi-channel ROSA 112, e.g., an array waveguide grating (AWG), detectors, amplification circuitry and so on. The transmit connecting circuit 104 and the receive connecting circuit 108 include at least conductive paths to provide electrical connections, and may also include additional circuitry. The multi-channel TOSA 110 transmits and multiplexes multiple different channel wavelengths, and is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector receptacle provides optical connections to the multi-channel TOSA 110, and provides optical connections to the multi-channel ROSA 112. The LC connector receptacle may be configured to receive and be coupled to a mating LC connector 116 such that transmit optical fiber 122 of the external fibers 124 optically couples to the multi-channel TOSA 110 arrangement, and the receive optical fiber 117 of the external fibers 124 optically couples to the multi-channel ROSA 112.

The multi-channel TOSA arrangement 110 can include multiple laser packages and optics for producing associated channel wavelengths, and can couple the same into the transmit optical fiber 122. In particular, the lasers in the multi-channel TOSA arrangement 110 can convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. In other cases, the lasers may comprise electro-absorption modulated laser (EML) laser diode packages. The multi-channel TOSA 110 may also include monitor photodiodes for monitoring the light emitted by the lasers. The multi-channel TOSA 110 may further include one or more temperature control devices, such as a resistive heater and/or a thermoelectric cooler (TEC), for controlling a temperature of the lasers, for example, to control or stabilize the laser wavelengths.

The multi-channel ROSA 112 can include demultiplexing optics such as an AWG device 402, as discussed further below, and a plurality of detectors such as photodiode packages configured to receive de-multiplexed channel wavelengths. The ROSA 112 can use the detectors and associated circuitry (e.g., a TIA) to detect, amplify and convert de-multiplexed channel wavelengths and can provide the same as electrical data signals, e.g., RX_D1 to RX_D4.

Figure 2:
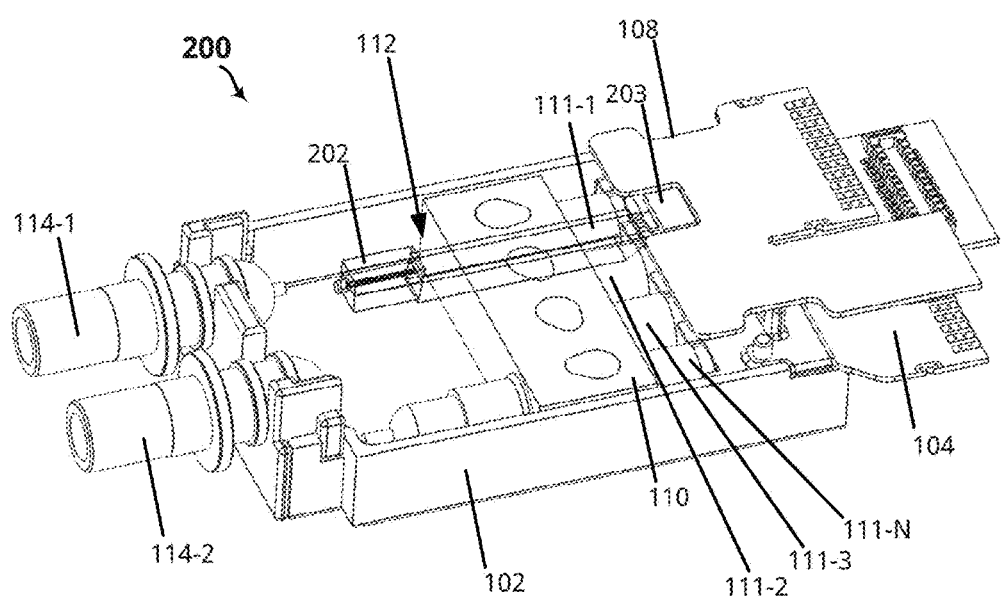
FIG. 2 is a perspective view of an example small form-factor (SFF) pluggable transceiver with a multi-channel TOSA configuration and a multi-channel ROSA, in accordance with an embodiment of the present disclosure.

Referring to FIG. 2, an example small form-factor (SFF) pluggable optical transceiver 200 with a multi-channel TOSA arrangement 110 and multi-channel ROSA 112 is shown in accordance with an embodiment of the present disclosure. The embodiment shown in FIG. 2 is one example of the optical transceiver 100 of FIG. 1 implemented in a small-form factor (SFF) configuration. In some cases, the optical transceiver 200 may implement the QSFP+ specification, or other applicable pluggable small-form factor specification. To this end, and in an embodiment, the optical transceiver 200 may be compliant with the QSFP28 MSA standard, and may include physical dimensions that conform to the SFF-8661 specification. In other cases, the optical transceiver 200 may implement the C form-factor pluggable (CFP) standard. In any such cases, the optical transceiver 200 may be configured to transmit and receive at a line rate of at least 100 Gb/s, respectively. This may be particularly advantageous when using the optical transceiver in, for example, a 100GBASE-LR4 application, per the IEEE 802.3ba standard.

As shown, the optical transceiver 200 includes a transceiver housing 102, a multi-channel TOSA arrangement 110 including a plurality of laser packages 111-1 to 111-N to generate associated channel wavelengths and associated circuitry. The multi-channel TOSA arrangement 110 electrically couples to transmit flexible printed circuit (FPC) 104 and couples to the optical interface port 114-1 at an end of the transceiver housing 102. The multi-channel ROSA arrangement 112 electrically couples to a receive FPC 108, and couples to the optical interface receptacle 114-2 at an end of the transceiver housing 102. In an embodiment, the optical transceiver 200 can be configured to operate in a WDM passive optical network (PON), and to this end, the AWG 202 may be configured as a passive optical device. However, in some cases the AWG 202 can include active components and is not necessarily limited in this regard.

The multi-channel TOSA arrangement 110 can include a plurality of laser packages 111-1 to 111-N with each comprising, for example, an EML laser diode package. Each EML laser may include an integrated electro-absorption modulator (EAM) on a single chip, for example. Other laser types are also within the scope of this disclosure such as, for example, directly modulated laser (DML) diodes and TO can-type laser diodes. The particular laser type chosen may be based on a desired application. For instance, applications that require long-distance, e.g., about 10 km or greater, may favor EML lasers. Conversely, applications requiring shorter distances may use DMLs. In any event, and in accordance with an embodiment, each laser package 111-1 to 111-N of the multi-channel TOSA arrangement 110 can be configured to transmit at about 25 Gb/s, or greater. Each laser package 111-1 to 111-N of the multi-channel TOSA arrangement 110 may provide a relatively narrow spectrum of channel wavelengths such as a single channel wavelength, or may be configured to provide a broad spectrum of channel wavelengths based on associated optics. In an embodiment, the lasers can provide center wavelengths 375 nm to 1650 nm, for example.

The multi-channel ROSA arrangement 112 can include a demux device, such as the arrayed waveguide grating (AWG) device 202. The AWG 202 may be configured to demultiplex a signal, e.g., a WDM signal, received via the optical interface port 115 into individual channel wavelengths. One example AWG device particularly well suited for the techniques disclosed herein is disclosed in U.S. patent application Ser. No. 15/137,823 entitled "Techniques for Direct Coupling of Photodetectors to Optical Demultiplexer Outputs and an Optical Transceiver using the Same" filed on Apr. 25, 2016, which is incorporated herein by reference in its entirety. An intermediate fiber 312 (FIGS. 3 and 4) may extend from the optical interface port 114-2 to an input of the AWG device 202. As discussed further below, the position of the AWG device 202 within the transceiver housing may provide a route for the intermediate optical fiber that reduces the severity of the bends necessary to route the same between an optical coupling receptacle and a de-multiplexing device.

An output of the AWG 202 device can be coupled to, for example, an array of quad p-intrinsic-n (PIN) diodes and associated TIAs 203 for the purposes of detecting, amplifying and converting each of the channel wavelengths into an electrical signal. The AWG device 202 can be compatible with channel spacing configurations that comport with, for example, 25 nm IEEE LX-4 grids, 20-nm ITU G.694.2

CWDM grids, and a range of ITU G.694.1 DWDM grids in the range of 400 Ghz to 800 Ghz (e.g., 2 nm to 4 nm).

Although specific examples and scenarios disclosed herein are directed to an AWG device within a ROSA arrangement, this disclosure should not be construed as limiting in this regard. The techniques disclosed herein may be equally applicable with minor modifications to other subassemblies, such as TOSAs, that seek to route an intermediate optical fiber within a transceiver housing.

Turning to FIG. 4, another example of the optical transceiver 200 is shown in accordance with an embodiment of the present disclosure. The optical transceiver 200 is shown in a simplified manner. For example, the optical coupling receptacle 114-1, TOSA arrangement 110, and top cover portion are omitted merely for the purpose of clarity and practicality. As shown, the transceiver housing 301 includes a plurality of sidewalls, e.g., sidewalls 304-1 to 304-2, that extend from a first end 306 to a second end 308 along a longitudinal axis 313. The longitudinal axis 313 also generally denotes a center longitudinal line of the transceiver housing 102. An inner surface of the plurality of sidewalls 304-1 and 304-2 may define at least a portion of the cavity 314. As further shown, an AWG device 202 is at least partially disposed within the cavity 314. The AWG device 202 may extend length-wise in parallel with the longitudinal center line 313. A flexible printed circuit board (FPC) 322 having the receive connecting circuit 108 may also at least partially be disposed within the cavity 314.

The receive connecting circuit 108 of the FPC 322 may comprise, for example, a TIA 203 or other suitable circuitry configured to receive data from, for example, photodetectors (not shown) associated with the AWG device 202 in order to amplify and convert the same into electrical signals, e.g., RX_D1 to RX_D4. The receive FPC 322 is discussed in greater detail below with regard to FIG. 5. A bracket 316 may form an interference or press-fit with the transceiver housing 301 and may assist in holding the FPC 322 in position.

Continuing with FIG. 4, the AWG device 202 may be disposed within the cavity 314 and positioned to at least partially extend into a slot 324 (FIG. 5) of the FPC 322. Thus the AWG device 202 may be disposed in a rearward position that is adjacent to the first end 306 of the transceiver housing 102 in order to provide sufficient clearance for the intermediate optical fiber 312 to couple into the AWG 202 without exceeding a minimum bending radius, which is discussed further below in greater detail.

In an embodiment, the optical transceiver 200 may include relatively constrained dimensions, e.g., a SFF configuration. For example, the transceiver housing 102 may include an overall length $L_1$ of about 20 mm and a cross-wise width $W_1$ of about 10 mm, although other overall lengths $L_1$ and widths $W_1$ are within the scope of this disclosure depending on the dimensions particular optical transceiver housing. As discussed above with regard to FIG. 3, such constrained dimensions may thus cause a route taken by the intermediate optical fiber 312 to introduce bends that are less than a minimum bending radius ($R_{min}$) associated with the intermediate optical fiber 312. For example, the constraints of the transceiver housing 102, e.g., a 10 mm width $W_1$, the resulting bend radius $R_1$ for the intermediate optical fiber 312 may be about equal to or less than a minimum bending radius ($R_{min}$) for the intermediate optical fiber 312, which is to say about 4 mm for the sake of providing one specific non-limiting example. As previously discussed, the $R_{min}$ may vary depending on the particular properties of the intermediate fiber cable 312, and the particular specific example radiuses and measurements discussed herein are not intended to limit the present disclosure.

On the other hand, in accordance with an embodiment, when the AWG device 202 is disposed at distance $D_1$ relative to sidewall 304-2, with distance $D_1$ being laterally offset from the longitudinal center line 313 of the transceiver housing 102 by lateral offset $D_{offset}$, the bend radius $R_2$ results. As shown, the lateral offset of $D_{offset}$ displaces the AWG device 202 generally towards the optical coupling receptacle 114-2. The resulting bend radius R2 thus provides a larger bend radius relative to bend radius $R_1$, and accordingly, more tolerance for a route taken by the intermediate optical fiber 312 in the region of the cavity 314 adjacent to the sidewall 304-1.

In one specific example embodiment, the lateral offset $D_{offset}$ is at least about 1 mm, although other offsets are also applicable depending on the dimensions of the particular transceiver housing. In some cases, the lateral offset $D_{offset}$ is between about 0.5 and 10 mm, for example. Thus a proportional increase in bend radius is observed relative to bend radius $R_1$ as the intermediate optical fiber 312 includes a resulting bend radius of $R_2$ (e.g., $R_1 + D_{offset} = R_2$). As shown, the intermediate optical fiber 312 includes a continuous curvilinear portion, e.g., the bend 330, adjacent the AWG 202, with the continuous curve linear portion having an arc length of at least 90 degrees. Accordingly, the bend radius $R_2$ may significantly reduce loss relative to bend radius $R_1$, and moreover, provide a relatively larger degree of tolerance as the intermediate fiber 312 is routed and attached during manufacturing. Accordingly, and depending on the particular $D_{offset}$ chosen, the bend radius $R_2$ may be at least about 1.5× greater than the bend radius $R_1$ and/or the minimum bend radius $R_{min}$ associated with the intermediate optical fiber 312. Thus fiber losses may advantageously be minimized or otherwise reduced.

Figure 5:
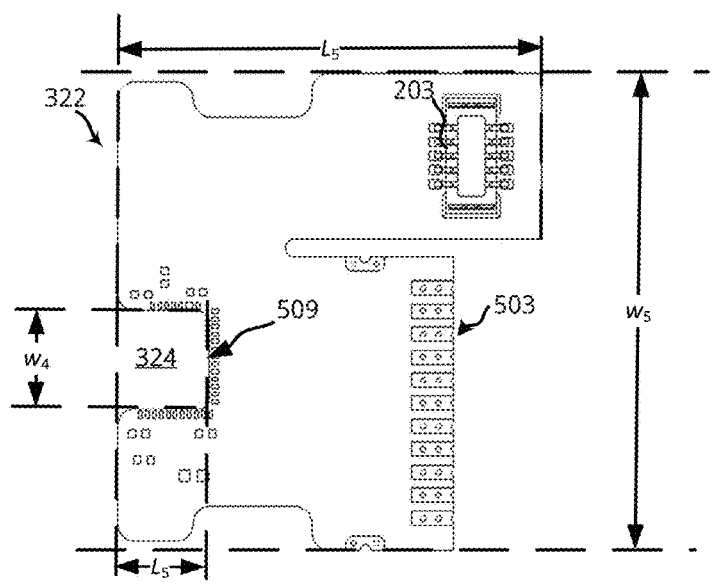
FIG. 5 shows an example flexible printed circuit for use in the optical transceiver of FIG. 4, in accordance with an embodiment of the present disclosure.

FIG. 5 shows the FPC 322 in isolation in accordance with an embodiment. As shown, the FPC 322 includes leads 503 for connecting with external mating circuitry and controllers (not shown), a TIA 203, and a slot 324. The FPC 322 includes an overall length $L_5$ and an overall width $W_5$. The overall length $L_5$ may measure about 10 mm and width $W_5$ may measure about 9 mm, although other lengths and widths are within the scope of this disclosure. In some cases, the overall width $W_5$ allows the FPC 322 to reside within the footprint of the transceiver housing 102, and more particularly, is less than or about equal to the width $W_1$ of the transceiver housing 102.

In an embodiment, the slot 324 is configured to surround at least a portion of the AWG 202, and allows the AWG device 202 to occupy a rearward position of the housing 501 by allowing an end of the AWG 202 to abut the edge 509 of the slot 324. The slot 324 may also be accurately referred to as a notch, opening, or cutout. The slot 324 of the FPC 322 can include a width $W_4$ substantially equal to or slightly greater (e.g., +5%) than a corresponding cross-wise width $W_5$ of the AWG device 202. Likewise, the slot 324 of the FPC 322 can include a length $L_5$ configured to allow at least a portion of the AWG device 202 to extend into the slot 324. In one specific example embodiment, the slot 324 includes a width $W_4$ of about 2 mm and a length $L_5$ of about 2 mm, although other lengths and widths may be used depending on the particular dimensions chosen for the AWG device 202.

Further Example Embodiments

In accordance with an aspect of the present disclosure an optical transceiver is disclosed. The optical transceiver including a housing comprising a plurality of sidewalls extending from a first end to a second end along a longitudinal axis, wherein the plurality of sidewalls define a cavity having a first longitudinal center line, an arrayed waveguide grating (AWG) device at least partially disposed within the cavity and having a second longitudinal center line that extends substantially in parallel with the first longitudinal center line of the cavity, the second longitudinal center line being disposed at a lateral offset $D_{offset}$ relative to the first longitudinal center line, an optical coupling receptacle at least partially disposed within the cavity for optically coupling to a receive optical fiber, and an intermediate optical fiber disposed within the cavity and having a first end optically coupled to the optical coupling receptacle and a second end optically coupled to the AWG device, the intermediate fiber having a bend adjacent to the second end of the intermediate optical fiber with a bend radius equal to or greater than a minimum bend radius $R_{min}$ associated with the intermediate optical fiber to reduce fiber bending losses.

In accordance with another aspect of the present disclosure an optical transceiver module is disclosed. The optical transceiver module including a transceiver housing comprising a plurality of sidewalls extending from a first end to a second end along a longitudinal axis, wherein the plurality of sidewalls define a cavity having a first longitudinal center line, a multi-channel receiver optical sub-assembly (ROSA) arrangement located in a cavity of the transceiver housing, the ROSA arrangement comprising an arrayed waveguide grating (AWG) device at least partially disposed within the cavity and having a second longitudinal center line that extends substantially in parallel with the first longitudinal center line of the cavity, the second longitudinal center line being disposed at a lateral offset $D_{offset}$ relative to the first longitudinal center line, an optical coupling receptacle at least partially disposed within the cavity for optically coupling to a receive optical fiber, and an intermediate optical fiber disposed within the cavity and having a first end optically coupled to the optical coupling receptacle and a second end optically coupled to the AWG device, the intermediate fiber having a bend adjacent to the second end of the intermediate optical fiber with a bend radius equal to or greater than a minimum bend radius $R_{min}$ associated with the intermediate optical fiber to reduce fiber bending losses, a multi-channel transmitter optical assembly (TOSA) including at least one laser package located in the transceiver housing for transmitting optical signals at different channel wavelengths.

In accordance with another aspect of the present disclosure an optical transceiver is disclosed. The optical transceiver including a housing comprising a plurality of sidewalls extending from a first end to a second end along a longitudinal axis, wherein the plurality of sidewalls define a cavity having a first longitudinal center line, an arrayed waveguide grating (AWG) device at least partially disposed within the cavity and having a second longitudinal center line that extends substantially in parallel with the first longitudinal center line of the cavity, the second longitudinal center line being disposed at a lateral offset $D_{offset}$ relative to the first longitudinal center line, an optical coupling receptacle at least partially disposed within the cavity for optically coupling to a receive optical fiber, and an intermediate optical fiber disposed within the cavity and having a first end optically coupled to the optical coupling receptacle and a second end optically coupled to the AWG device, the intermediate fiber having a bend adjacent to the second end of the intermediate optical fiber with a bend radius greater than or equal to a minimum bend radius $R_{min}$ associated with the intermediate optical fiber, the minimum bend radius $R_{min}$ being 4 millimeters.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical transceiver comprising:
   a housing comprising a plurality of sidewalls extending from a first end to a second end along a longitudinal axis, wherein the plurality of sidewalls define a cavity having a first longitudinal center line;
   an arrayed waveguide grating (AWG) device at least partially disposed within the cavity and having a second longitudinal center line that extends substantially in parallel with the first longitudinal center line of the cavity, the second longitudinal center line being disposed at a lateral offset $D_{offset}$ that measures at least 1 millimeter relative to the first longitudinal center line;
   an optical coupling receptacle at least partially disposed within the cavity for optically coupling to a receive optical fiber; and
   an intermediate optical fiber disposed within the cavity and having a first end optically coupled to the optical coupling receptacle and a second end optically coupled to the AWG device, the intermediate fiber having a bend adjacent to the second end of the intermediate optical fiber with a bend radius equal to or greater than a minimum bend radius $R_{min}$ associated with the intermediate optical fiber to reduce fiber bending losses.

2. The optical transceiver of claim 1, wherein the bend radius is least 1.5× greater than the minimum bend radius $R_{min}$.

3. The optical transceiver of claim 1, wherein a diameter of the intermediate optical fiber is about 0.20 to 0.25 millimeters and the bend radius is equal to or greater than 4 mm.

4. The optical transceiver of claim 1, wherein lateral offset $D_{offset}$ displaces the AWG device towards the optical coupling receptacle relative to the second longitudinal center line of the cavity.

5. The optical transceiver of claim 1, wherein the housing has a length $L_1$ of about 20 mm and a width $W_1$ of about 10 mm.

6. The optical transceiver of claim 1, wherein the optical receptacle is an LC-type receptacle.

7. The optical transceiver of claim 1, further comprising:
   a flexible printed circuit (FPC) disposed at least partially within the cavity and electrically coupled to the AWG device, wherein the FPC includes a slot having a width $W_4$ and a length $L_5$, the width $W_4$ and the length $L_5$ being configured to receive and surround at least a portion of the AWG device.

8. The optical transceiver of claim 1, wherein the AWG device forms at least a portion of a receiver optical subassembly (ROSA) arrangement.

9. The optical transceiver of claim 1, wherein the AWG device comprises a planar lightwave circuit chip configured to de-multiplex N number of channel wavelengths.

10. An optical transceiver module comprising:
a transceiver housing comprising a plurality of sidewalls extending from a first end to a second end along a longitudinal axis, wherein the plurality of sidewalls define a cavity having a first longitudinal center line;
a multi-channel receiver optical sub-assembly (ROSA) arrangement located in a cavity of the transceiver housing, the ROSA arrangement comprising:
an arrayed waveguide grating (AWG) device at least partially disposed within the cavity and having a second longitudinal center line that extends substantially in parallel with the first longitudinal center line of the cavity, the second longitudinal center line being disposed at a lateral offset $D_{offset}$ relative to the first longitudinal center line, wherein lateral offset $D_{offset}$ displaces the AWG device towards the optical coupling receptacle relative to the second longitudinal center line of the cavity;
an optical coupling receptacle at least partially disposed within the cavity for optically coupling to a receive optical fiber; and
an intermediate optical fiber disposed within the cavity and having a first end optically coupled to the optical coupling receptacle and a second end optically coupled to the AWG device, the intermediate fiber having a bend adjacent to the second end of the intermediate optical fiber with a bend radius equal to or greater than a minimum bend radius $R_{min}$ associated with the intermediate optical fiber to reduce fiber bending losses;
a multi-channel transmitter optical assembly (TOSA) including at least one laser package located in the transceiver housing for transmitting optical signals at different channel wavelengths.

11. The optical transceiver module of claim 10, wherein the bend radius is least 1.5× greater than the minimum bend radius $R_{min}$.

12. The optical transceiver module of claim 10, wherein a diameter of the intermediate optical fiber is about 0.20 to 0.25 millimeters and the bend radius is equal to or greater than 4 mm.

13. The optical transceiver module of claim 10, wherein the lateral offset $D_{offset}$ measures at least 1 millimeter relative to the first longitudinal center line of the cavity.

14. The optical transceiver module of claim 10, wherein the transceiver housing has a length $L_1$ of about 20 mm and a width $W_1$ of about 10 mm.

15. The optical transceiver module of claim 10, wherein the optical receptacle is an LC-type receptacle.

16. An optical transceiver comprising:
a housing comprising a plurality of sidewalls extending from a first end to a second end along a longitudinal axis, wherein the plurality of sidewalls define a cavity having a first longitudinal center line;
an arrayed waveguide grating (AWG) device at least partially disposed within the cavity and having a second longitudinal center line that extends substantially in parallel with the first longitudinal center line of the cavity, the second longitudinal center line being disposed at a lateral offset $D_{offset}$ that measures at least 1 millimeter relative to the first longitudinal center line;
an optical coupling receptacle at least partially disposed within the cavity for optically coupling to a receive optical fiber; and
an intermediate optical fiber disposed within the cavity and having a first end optically coupled to the optical coupling receptacle and a second end optically coupled to the AWG device, the intermediate fiber having a bend adjacent to the second end of the intermediate optical fiber with a bend radius greater than or equal to a minimum bend radius $R_{min}$ associated with the intermediate optical fiber, the minimum bend radius $R_{min}$ being 4 millimeters.

17. The optical transceiver of claim 16, wherein the optical transceiver is implemented in a small form-factor (SFF) housing.

18. The optical transceiver of claim 17, wherein lateral offset $D_{offset}$ displaces the AWG device towards the optical coupling receptacle relative to the second longitudinal center line of the cavity.

* * * * *